US012662575B2

(12) United States Patent
Tan et al.

(10) Patent No.: US 12,662,575 B2
(45) Date of Patent: Jun. 23, 2026

(54) HIGHLY AROMATIC AND LIQUID-CRYSTALLINE HOMO-POLYIMIDES WITH AROMATIC ENDGROUPS AND CROSSLINKED PRODUCTS THEREFROM

(71) Applicant: Government of the United States, as represented by the Secretary of the Air Force, Wright-Patterson AFB, OH (US)

(72) Inventors: Loon-Seng Tan, Centerville, OH (US); Zhenning Yu, Beavercreek, OH (US); Bingqian Zheng, Miamisburg, OH (US); Hilmar Koerner, Beavercreek, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 619 days.

(21) Appl. No.: 18/299,090

(22) Filed: Apr. 12, 2023

(65) Prior Publication Data

US 2024/0110011 A1 Apr. 4, 2024

Related U.S. Application Data

(60) Provisional application No. 63/406,017, filed on Sep. 13, 2022.

(51) Int. Cl.
*C08G 73/10* (2006.01)
*C08L 79/08* (2006.01)

(52) U.S. Cl.
CPC ......... *C08G 73/1067* (2013.01); *C08G 73/10* (2013.01); *C08G 73/1078* (2013.01); *C08L 79/08* (2013.01)

(58) Field of Classification Search
CPC ...... C08G 73/10; C08G 73/1078; C08L 79/08
See application file for complete search history.

(56) References Cited

U.S. PATENT DOCUMENTS

| | | | |
|---|---|---|---|
| 5,196,506 | A | 3/1993 | Tamai et al. |
| 5,606,014 | A | 2/1997 | Connell et al. |
| 6,124,035 | A | 9/2000 | Connell et al. |
| 6,350,817 | B1 | 2/2002 | Connell et al. |
| 10,988,437 | B1 | 4/2021 | Tan et al. |
| 11,608,310 | B1 | 3/2023 | Tan et al. |
| 2015/0275089 | A1 | 10/2015 | Katano et al. |
| 2021/0187902 | A1 | 6/2021 | Fujiwara et al. |

FOREIGN PATENT DOCUMENTS

| | | | |
|---|---|---|---|
| JP | 2000248252 | A | 9/2000 |
| JP | 2009079008 | A | 4/2009 |
| JP | 4467662 | B2 | 5/2010 |

OTHER PUBLICATIONS

Asanuma et al.Synthesis of Thermotropic Liquid Crystal Polyimide and Its Properties, Journal of Polymer Science: Part A Polymer Chemistry, vol. 32, pp. 2111-2118 (1994), published on Nov. 1994.*
U.S. Appl. No. 18/299,092, filed Apr. 12, 2023.
U.S. Appl. No. 18/299,096, filed Apr. 12, 2023.
U.S. Appl. No. 18/299,100, filed Apr. 12, 2023.
U.S. Appl. No. 18/299,353, filed Apr. 12, 2023.
U.S. Appl. No. 18/299,375, filed Apr. 12, 2023.
Nye, S. A.: Polyimides synthesized from 4,4'-(1,2-ethynediyl)bis(phthalic anhydride). Journal of Polymer Science, Part A: Polymer Chemistry 1990, 28, 2633-40.
Pardey, R.; Zhang,A.; Gabori, P. A.; Harris,F. W.; Stephen Z. D. Cheng, S. Z. D.; Jerry Adduci, J.; Facinelli, J. V.; Lenz, R. W.; Monotropic Liquid Crystal Behavior in Two Poly(ester imides)with Even and Odd Flexible Spacers Macromolecules 1992, 25, 5060-5068.
Inoue, T.; Kakimoto, M.-A.; Imai, Y.; Watanabe, J.: First Observation of a Thermotropic Liquid Crystal in a Simple Polyimide Derived from 1,11-Diaminoundecane and 4,4"-Terphenyltetracarboxylic Acid. Macromolecules 1995, 28, 6368-6370.
Inoue, T.; Kumagai, K.; Kakimoto, M.; Imai, Y.; Watanabe, J.; High-Pressure Synthesis and Properties of Aliphatic-Aromatic Polyimides via Nylon-Salt-Type Monomers Derived from Aliphatic Diamines with Pyromellitic Acid and Biphenyltetracarboxylic Acid Macromolecules 1997, 30, 1921-1928.
Kaneko, T. I. Imamura, K.: Watanabe, J.; Reversible Crystal Deformation Observed in the Main-Chain Type of Liquid Crystalline Polyimide, Macromolecules 1997, 30, 4244-4246.
Sato, M.; Ujiie, S.; Tada, Y.; Kato, T. Semirigid: Homo- and Copoly(Imide-Carbonate)s Based on 3,4,3 ,4-p-Terphenyltetracarboxdiimide. High Performance Polymers 1998, 10, 155-162.
Fernberg, P; Guan Gong, G.; Mannberg, P.; Tsampas, S.; Development of novel high Tg polyimide-based composites. Part I: RTM processing properties Journal of Composite Materials 2018, vol. 52(2) 253-260.
Abbott, A.; Gibson, T.; Tandon, G. P.; Hu, L.; Avakian, R.; Baur, J.; Koerner, H.: Melt extrusion and additive manufacturing of a thermosetting polyimide. Additive Manufacturing 2021, 37, 101636.
Zhang, H.; Wang, W.; Chen, G.; Zhang, A.; Fang, X.: Melt-Processable Semicrystalline Polyimides Based on 1,4-Bis(3,4-dicarboxyphenoxy)benzene Dianhydride (HQDPA): Synthesis, Crystallization, and Melting Behavior. Polymers 2017, 9.
Noël, C.; Navard, P.: Liquid crystal polymers. Progress in Polymer Science 1991, 16, 55-110.

(Continued)

*Primary Examiner* — Gregory Listvoyb
(74) *Attorney, Agent, or Firm* — AFMCLO/JAZ; Charles R. Figer, Jr.

(57) ABSTRACT

Applicants disclose a family of low-molecular-weight, main-chain thermotropic liquid-crystalline polyimides (TLC-PI) that are thermally crosslinkable and processes of making and using same. Such materials provide flexibility advantage when modifying ink materials to meet varying processing conditions in additive manufacturing of devices and components that require high-temperature polymers.

14 Claims, 10 Drawing Sheets
(7 of 10 Drawing Sheet(s) Filed in Color)

(56) References Cited

OTHER PUBLICATIONS

Connell, J. W.; Smith, J. G., Jr.; Hergenrother, P. M.: Oligomers and polymers containing phenylethynyl groups. Journal of Macromolecular Science, Reviews in Macromolecular Chemistry and Physics 2000, C40, 207-230.
Smith, J. G., Jr.; Connell, J. W.: Chemistry and properties of imide oligomers from phenylethynyl-containing diamines. High Performance Polymers 2000, 12, 213-223.
Connell, J. W.; Smith, J. G., Jr.; Hergenrother, P. M.: Properties of imide oligomers containing pendent phenylethynyl groups. High Performance Polymers 1997, 9, 309-321.
Kricheldorf, H. R.: Liquid-crystalline polyimides. Advances in Polymer Science 1999, 141, 83-187.
Takeichi, T.; Tanikawa, M.; Internal Acetylene Unit Linked para to the Aromatic Ring as a Crosslink Site for Polyimide Journal of Polymer Science: Part A: Polymer Chemistry, 1996, vol. 34, 2205-2211.
Meng, Y. Z.; Tjong, S. C.; Hay, A. S.; Morphology, rheological and thermal properties of the melt blends of poly (phthalazinone ether ketone sulfone) with liquid crystalline co polyester Polymer 1998, vol. 39, No. 10, pp. 1845-1850.
Guan, Q.; Picken, S. J.; Sheiko, S. S.; Theo J. Dingemans, T. J.; High-Temperature Shape Memory Behavior of Novel All Aromatic (AB)n-Multiblock Copoly(ester imide)s Macromolecules 2017, 50, 3903-3910.
Liu, S. L.; Chung, T. S.; Geng, J. X.; Zhou, E. L.; Tamai, S.; Phase Transition and Transition Kinetics of a Thermotropic Poly(amide-imide) Derived from 70% Pyromellitic Dianhydride, 30% Terephthaloyl Chloride, and I ,3-Bis [4-(4'-aminophenoxy)cumyl]benzene Macromolecules 2001, 34, 8710-8719.
Guan, Q.; Norder, B.; Chu, L.; Besseling, N. A. M.; Picken, S. J.; Theo J. Dingemans, T. J.; All-Aromatic (AB)n-Multiblock Copolymers via Simple One-Step Melt Condensation Chemistry Macromolecules 2016, 49, 8549-8562.
Tamboli, A. B.; Ghodke, S. D.; Diwate, A. V.; Joshi, M. D.; Ubale, V. P.; Maldar, N. N.: Processable poly (ether ether ketone imide)s. High Performance Polymers 2021, DOI: 10.1177/09540083211055044.
U.S. Appl. No. 16/752,794.
U.S. Appl. No. 16/752,804.
U.S. Appl. No. 18/103,860.
Asanuma, T.; Oikawa, H.; Ookawa, Y.; Yamasita, W.; Matsuo, M.; Yamaguchi, A.: Synthesis of thermotropic liquid crystal polyimide and its properties. Journal of Polymer Science, Part A: Polymer Chemistry 1994, 32, 2111-18.
Zheng, B.; Ree, B.; Yu, Z.; Tan, L.; Koerner, H.; Development of high-performance nematic liquid crystalline polyimides (LCPI) for 3D printing, Presentation Aug. 2022.
Human-Assisted Machine Translation of Hongwei et al.; Chemical Reagents, 2009, 31 (9), 673-676 (Year: 2009).
Untranslated Hongwei et al. Chemical Reagents, 2009, 31 (9), 673-676 (Year: 2009).
JP-2009079008-A Machine Translation (Year: 2009).
Pyrolysis of Organic Molecules, Second Edition, 2019, Chapter 12, pp. 483-553 (Year: 2019).
Aug. 6, 2024, Office Action for U.S. Appl. No. 18/299,092.

* cited by examiner

HIGHLY AROMATIC AND LIQUID-CRYSTALLINE HOMO-POLYIMIDES WITH AROMATIC ENDGROUPS AND CROSSLINKED PRODUCTS THEREFROM

CROSS-REFERENCE TO RELATED APPLICATION

The present application claims priority to U.S. Provisional Application Ser. No. 63/406,017 filed Sep. 13, 2022, the contents of which is hereby incorporated by reference in their entry. The present application is related to, but does not claim priority to, U.S. application Ser. No. 14/999,921 which was filed under a secrecy order on Jan. 25, 2017.

RIGHTS OF THE GOVERNMENT

The invention described herein may be manufactured and used by or for the Government of the United States for all governmental purposes without the payment of any royalty.

FIELD OF THE INVENTION

The present invention relates to a family of low-molecular-weight, main-chain thermotropic liquid-crystalline polyimides (TLC-PI) that are thermally crosslinkable and processes of making and using same.

BACKGROUND OF THE INVENTION

Applicants disclose a family of low-molecular-weight, main-chain thermotropic liquid-crystalline polyimides (TLC-PI) that are thermally crosslinkable and processes of making and using same. These TLC-PIs are based on (i) a unique, liquid-crystallinity (LC)-enabling diamine, namely, 1,3-bis[4-(4'-aminophenoxy)cumyl]benzene (BACB) and (ii) a mesogenic dianhydride that can be either thermally nonreactive such as pyromellitic dianhydride (PMDA) and terphenyl dianhydride (TPDA) or a diphthalic dianhydride (DPA) that contains one or more thermally reactive and crosslinkable moieties similar to that of phenylethynyl (PE). In addition, the thermally crosslinkable TLCP-PI is endcapped by either a non-reactive anhydride such as phthalic anhydride (PA) or thermally reactive one such as 4-phenylethynylanhydride (PEPA). The LC-to-isotropic phase (iso) transition temperatures of TLCP-PI, particularly those based on TPDA (LC-iso ~265° C.) and PE-DPA (LC-iso ~236° C.) are well below the that of the parent LC-PI, namely high molecular-weight PMDA-BACB polyimide (TLC-iso ~310° C.) and the curing onset temperatures of traditional PE-based thermosetting polyimides [$T_{(cure)onset}$>300° C.]. This feature provides the flexibility advantage in modifying the ink materials to meet varying processing conditions in additive manufacturing of devices and components that require high-temperature polymers.

SUMMARY OF THE INVENTION

Applicants disclose a family of low-molecular-weight, main-chain thermotropic liquid-crystalline polyimides (TLC-PI) that are thermally crosslinkable and processes of making and using same. Such materials provide flexibility advantage when modifying ink materials to meet varying processing conditions in additive manufacturing of devices and components that require high-temperature polymers.

Additional objects, advantages, and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated in and constitute a part of this specification, illustrate embodiments of the present invention and, together with a general description of the invention given above, and the detailed description of the embodiments given below, serve to explain the principles of the present invention.

DETAILED DESCRIPTION OF THE INVENTION

Definitions

Figure 1:
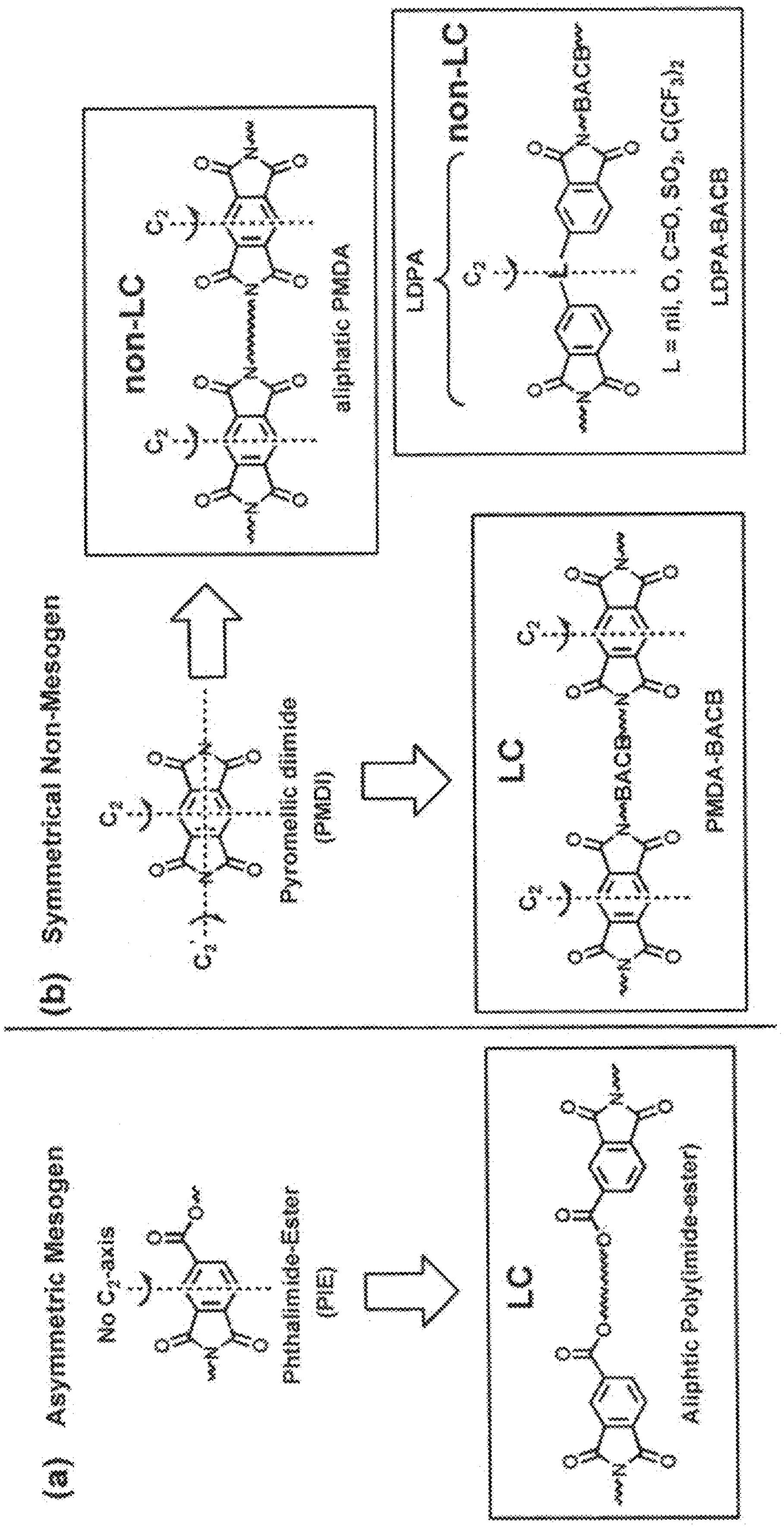
FIG. 1 depicts the structural comparisons of (a) an asymmetric phthalimide-ester (PIE) mesogen and (b) the symmetrical pyromellitimide, PMDI and linked diphthalic dianhydride (LDPA). and (in boxes) the corresponding repeat units in their polyimides that are liquid crystalline (LC) or non-LC. The linking group (L) is generally a short linker and the wavy symbol represent flexible chains such as $(CH_2)_n$, $—(CH_2CH_2O)_n—$. BACB is a highly aromatic and flexible linker derived from the diamine, 1,3-bis[4'-(4"-aminophenoxy)cumyl)]benzene.

Unless specifically stated otherwise, as used herein, the terms "a", "an" and "the" mean "at least one".

As used herein, the terms "include", "includes" and "including" are meant to be non-limiting.

As used herein, the words "about," "approximately," or the like, when accompanying a numerical value, are to be construed as indicating a deviation as would be appreciated by one of ordinary skill in the art to operate satisfactorily for an intended purpose.

As used herein, the words "and/or" means, when referring to embodiments (for example an embodiment having elements A and/or B) that the embodiment may have element A alone, element B alone, or elements A and B taken together.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

BACB is an abbreviation for "1,3-bis[4-(4'-aminophenoxy)cumyl]benzene" moiety.

DPA is an abbreviation for Di-(Phthalic Dianhydride) or diphthalic dianhydride.

DSC is an abbreviation for Differential scanning calorimetry.

EDPA is an abbreviation for compound with a chemical name of "ethynyl-4,4'-di(phthalic anhydride)."

EFPE-DPA: is an abbreviation for compound with a chemical name of "4,4'-(2-fluoro-1,4-phenylene)bis(ethyne-2,1-diyl)diphthalic anhydride."

1,4EPE-DPA is an abbreviation for compound with a chemical name of "4,4'-(1,4-phenylenebis(ethyne-2,1-diyl)) diphthalic anhydride."

1,3EPE-DPA is an abbreviation for compound with a chemical name of "4,4'-(1,3-phenylenebis(ethyne-2,1-diyl)) diphthalic anhydride."

EPPE-DPA is an abbreviation for compound with chemical names of "4'-((3,4-dicarboxyphenyl)ethynyl)biphenyl-3,4-dicarboxylic dianhydride," and "4,4'-(biphenyl-4,4'-diylbis(ethyne-2,1-diyl))diphthalic anhydride."

LC is an abbreviation for liquid-crystalline or liquid-crystallinity.

LDPA is an abbreviation for linked di(phthalic dianhydride) moiety.

MPDA is an abbreviation for multi-phenoxy-linked 4,4'-dianiline.

PE-DPA or PEDPA is an abbreviation for compound with a chemical name of "4'-((3,4-dicarboxyphenyl)ethynyl)biphenyl-3,4-dicarboxylic dianhydride."

PIE is an abbreviation for "phthalimide-ester" moiety.

PMDA is an abbreviation for pyromellitic dianhydride.

PMDI is an abbreviation for pyromellitimide moiety.

POM is an abbreviation for Polarization Optical Microscopy.

NR-DPA is an abbreviation for Non-Reactive Di-(Phthalic Dianhydride).

R-DPA is an abbreviation for Reactive Di-(Phthalic Dianhydride)

TPDA is an abbreviation for compound with a chemical name of "terphenyl-3,3",4,4"-dianhydride".

TLC is an abbreviation for thermal crystalline or thermal crystallinity.

PA is an abbreviation for phthalic anhydride.

PEPA is an abbreviation for 4-phenylethynylphthalic anhydride.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Additive manufacturing or 3-dimensional (3D) printing makes three-dimensional objects by building up material, based upon design data provided from a computer aided design (CAD) system. One technique is to deposit a resolidifiable material in a predetermined pattern, according to design data provided from a CAD system, with the build-up of multiple layers forming the object. The resolidifiable "ink" materials can be either in the form of filaments or powdered resins.

Fused Filament Fabrication (or FFF) is one type of additive manufacturing (AM) technique. Materials used for fused filament fabrication are typically thermoplastic (linear) polymers in the form of filaments. The filaments are melted in a "printer" head and extruded onto a deposition surface, and form a solid layer upon cooling. Multiple layers are deposited one atop the other. The complete ensemble of the layers forms the 3-dimensional article.

Selective Laser Sintering (SLS) is another type of AM technique that uses a laser as the power source to sinter powdered material, aiming the laser focus automatically at points in space defined by a 3D model, binding the material together to create a solid structure. For hot environment applications such as those that can be found in aerospace applications, state of the art 3D printed thermoplastic articles lack key properties that enable use as engine externals or brackets and fixtures in cooler sections of an engine, ducting for cabin air, etc. Currently, the commonly used thermoplastic materials used in FFF or SLS technology are limited in use temperature and have poor thermo-oxidative stability. For example, state-of-the-art 3D filament printable aerospace grade thermoplastics such as ULTEM™ 1010, and ULTEM™ 9085 have use temperatures of 190° C. and 160° C., respectively, and are susceptible to creep during the 3D printing process. These thermoplastic melts are isotropic, that is they are not liquid-crystalline.

Accordingly, there is a need for new materials and methods for use in FFF, SLS, and other additive manufacturing techniques that demonstrate improved thermal stability, possess higher service-temperatures and have processibility like thermotropic liquid-crystalline polymers (TLCP). In TLCP systems, because of the generally lower melt viscosity associated with columnal or anisotropic flow as the result of the polymer-chain alignment in the liquid crystalline phase, which would likely to occur in the nozzle of a 3D printer, it is expected that liquid-crystalline character of the ink materials and ability to tailor such character would be advantageous to the above-mentioned additive manufacturing methods.

Liquid-Crystallinity. An important requirement in the processing of thermotropic liquid-crystalline polymer (TLCP) is having a workable LC temperature window (≥20° C.) for the TLCP to sustain the LC phase or anisotropy via dynamic molecular ordering and occurring well below a prescribed temperature for the onset of a well-defined cross-linking reaction in continuing heating to the temperature range well before the onset of anticipated degradation of polymer chains; or upon cooling at the end of LC mesophase that can result in a semicrystalline morphology. Both covalently crosslinked (amorphous) and (non-covalently cross-linked) semicrystalline products are known to possess improved mechanical, thermal and solvent resistant properties than the analogous TLCPs that are non-crosslinked and amorphous.

In thermotropic LC polymers, the transition temperatures from a crystal phase to a liquid crystal phase (LC), which may consist of one or more distinctly different LC textures observed under a polarized optical microscope (OPM), and finally to an isotropic phase, are strongly dependent on the molecular structures of mesogenic component and polymer chain as well as the molecular weight, as evidenced by the work of S. Hocine and M. H., Soft Matter, 2013, vol. 9, pp, 5839-5861. The LC temperature range is generally determined from the onset temperature at which the crystalline phase (ordered and rigid) of LCP begins to transform to liquid-crystalline phase (ordered but mobile) to the temperature at which significant amount of isotropic melt (biphasic) is observed. This former temperature is denoted as "crystal-to-liquid-crystal" or $T_{Crys-LC}$, and the latter is designated as $T_{iso}$.

For thermotropic LCP, there are generally two types of LC morphology depending on the structures driven by the dynamics of the molecular-to-meso-scale arrangements of the mesogenic units in the polymer chains. When the morphology of the LC phase shows only an orientational ordering of the mesogenic units in the LCP following a general direction or a director, and no positional ordering, this relatively simple LC phase is designated as "nematic" phase. On the other hand, the morphology of LC phase designated as "smectic" mesophase is more complex. It has a lamellar or layered structure that is characterized by the state of being both orientationally and positionally ordered, in which the mesogens self-organize in parallel layers. In addition, the general orientation of the parallel mesogens in one layer with respect to similarly parallel mesogens in the next layers can be "in-line" (Smectic-A), "offset" (Smectic B) or "offset and tilted" (Smectic C). Therefore, for the smectic morphology, one or more thermal and associated phase transition temperatures may be observed between $T_{Crys-CL}$ and $T_{iso}$.

The viscosity of the LC phase is a critical determinant in enhancing the processing ease for thermotropic LCP into fibers or oriented films. The macromolecules of LCPs are very stiff and generally have a rigid-rod structure. These rod-like macromolecules tend to align more easily than the coil-like macromolecules of amorphous thermoplastics along the flow or sheer direction under appropriate processing conditions. In comparison with typically linear thermoplastic polymers, the melt viscosity of LCP is generally lowered when they are molecularly aligned; and in many cases, a small amount of LCP added to thermoplastic polymers can result in a significantly lower melt viscosity in comparison to the pure melt of the thermoplastics, as illustrated by the work of Y. Z. Meng, et al. Polymer 1998, vol. 39, pp. 1845-1850.

A special class of thermotropic liquid-crystalline polymer (TLCP) is the main-chain polyimides (PI) which are typically synthesized from the polycondensation of an aromatic dianhydride and a diamine. These traditional thermotropic liquid-crystalline polyimides (TLCP-PI) are constituted by (i) the rigid dianhydride being the mesogen capable of self-aggregation to form the so-called liquid-crystalline (LC) phase, i.e., a mesophase which is a phase between crystal and isotropic melt phases; (ii) the diamine being the flexible and thermally mobile to facilitate the self-aggregation of the mesogenic units. From the structural standpoint of mesogenic anhydrides, there are generally two approach to the synthesis of thermotropic liquid-crystalline polyimides (TLC-PI), namely the utilization of mesogens that are either symmetrical dianhydrides such as pyromellitic dianhydride (PMDA), 3,4,3',4'-biphenyltetracarboxylic dianhydride (BPDA) and TPDA whose symmetry is defined by having a $C_2$-rotation molecular axis and unsymmetrical di(anhydride-ester) with the generic structure, AE-L-AE, in which the AE is an unsymmetrical anhydride, and L is a bivalent linking group (see FIG. 1 for the corresponding imide structures). Other symmetrical dianhydrides are 3,4,3',4'-benzophenone tetracarboxylic dianhydride (BTDA), 3,4,3',4'-diphenylsulfone tetracarboxylic dianhydride (BSDA) and 4,4'-oxy-di(phthalic anhydride) (ODPA). There have been a number of systematic studies conducted on the syntheses and TLC correlation of various aromatic-aliphatic semirigid polyimides composed of these symmetrical dianhydrides and aliphatic chains in the main chains. A general finding is that most of them are crystalline; and because of their poor mesogenic properties, they are unable to show TLC properties without the inclusion of a traditional biphenyl mesogen in the polymer backbones; thus poly(ester-imides) and poly(carbonate-imides) that were composed of asymmetric N-phenylphthalimide rings form LC phases. For examples, the work of M. Sato, et al. High Performance Polymers 1998, 10, 155-162, and that of T. Inoue, et al. Macromolecules 1995, vol. 28, pp. 6368-6370, have shown that the-thermotropic liquid crystals for the simple polyimides which consist of symmetrical imide rings and polymethylene spacers appear to be only that derived from TPDA and 1,11-diaminoundecane.

Pyromellitic dianhydride (PMDA) is a common, structurally rigid dianhydride, and the key building block for the well-known aromatic polyimide, namely Kapton, which is a semi-crystalline polymer. As illustrated by the work of H. R. Kricheldorf, et al. Makromolekulare Chemie, 1993, vol. 194, pp 1209-24, and that of M. Sato, et al. Polymer Journal 2002, vol. 34, pp. 158-165, while PMDA meets the structural rigidity of being an LC mesogen, a large number of polyimides and poly(ester-mide)s derived from PMDA and aliphatic components only form isotropic (non-LC) melts. Therefore, it was rather unusual that a thermotropic liquid-crystalline polyimide (TLC-PI) was reported in 1994 by Asanuma et al. Journal of Polymer Science, Part A: Polymer Chemistry 1994, 32, 2111-18. This particular polyimide, designated as PMDA-BACB, was synthesized from PMDA and a highly aromatic but flexible diamine, namely, 1,3-bis [4'-(4"-aminophenoxy)cumyl]benzene (BACB).

However, while PMDA-BACB polyimide is a thermotropic liquid crystalline polymer, its LC phase can be achieved at temperatures well above 300° C. and the associated melt viscosity is deemed impractical for the 3D-printing of thermoplastic or thermosetting polyimides. These processing issues are stemming from the exceeding strong propensity of the PMDA moieties to aggregate. Therefore, there is a need for non-PMDA dianhydrides that can lead to LC phase at or below 300° C. and/or are capable of thermal crosslinking at temperatures after LC transition temperatures.

Non-PMDA mesogenic dianhydrides with higher aspect ratios: A special family of rigid dianhydrides is based on α,ω-diphthalic dianhydride (DPA) motif, designated here as L(DPA), with the generic structure,

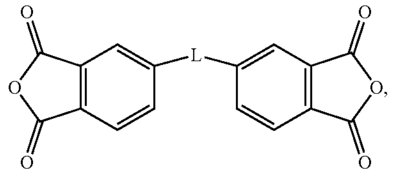

and formula as PA-L-PA, where PA is phthalic anhydride and L is direct bond or an aromatic and/or conjugated connector. The simplest L(DPA) dianhydride, namely, BPDA (3,3',4,4'-biphenyltetracarboxylic dianhydride; L=direct bond) is not mesogenic even when combined with the very flexible aliphatic, α,ω—$(CH_2)_n$, chains to enable the resulting polyimides to be thermotropic liquid-crystalline (TLC). As shown in our work, when the two PA units are connected by the most rigid two-carbon unit, namely the ethynyl bridge, the resulting ethynyl-diphthalic dianhydride) or EDPA in combination with the LC-promoting, highly aromatic diamine BACB, the resulting polyimide, EDPA-BACB is also not mesogenic.

However, when the two PA units are connected by a longer praraphenylene bridge, the resulting "higher-aspect-ratio" dianhydride, namely, TPDA (3,3',4,4'-p-terphenyltetracarboxdianhydride; L=praraphenylene) and diamines containing similar aliphatic chains did indeed result in TLC-polyimides, as shown by the work of M. Sato, et al. Macromolecular Chemistry and Physics 1996, vol. 197, pp. 2765-2774.

Composition and Synthesis of New Crosslinkable Thermotropic Polyimides: In this disclosure, we show that certain non-PMDA dianhydrides in combination with BACB can also form thermotropic LC polyimides. In an embodiment, certain bis(phthalic dianhydrides) or DPA's with higher aspect ratios than BPDA and BTDA when in combination with BACB can result in a new family of thermotropic LC-PI's. In yet another embodiment, when endcapped with thermally crosslinkable functional group such as phenyethynyls, the resulting BACB-based reactive oligoimides are thermotropic liquid-crystalline that can be cured in isotropic polyimide thermosets.

Molecular Weight Dependency of Thermotropic Liquid Crystallinity (TLC). Unlike small-molecule liquid-crystals which have polydispersity (PD) or molecular weight distribution (MWD) of unity, linear and thermotropic liquid crystalline polymers (TLCP) are characterized by having MWD values dictated by the polymerization conditions. Therefore, the thermal-transition and morphological characteristics of the corresponding liquid-crystalline phase are also dependent on the MWD of TLCP. Similar to the thermal-transition temperatures for amorphous and semi-crystalline polymers, there is generally a linear correlation between molecular weight and the transition temperatures of thermotropic LCP, including those of the mesophase transitions. Therefore, for consistency in studying the effect of changing the dianhydride from PMDA to those of bis (phthalic dianhydride) or DPA with various linking group (L) in BACB-containing and low-molecular weight polyimides (hereafter generically referred to as "imide oligomers" or "oligoimides"), degree of polymerization (DP) or theoretical number of repeating units (n) is set at 12

Figure 2:
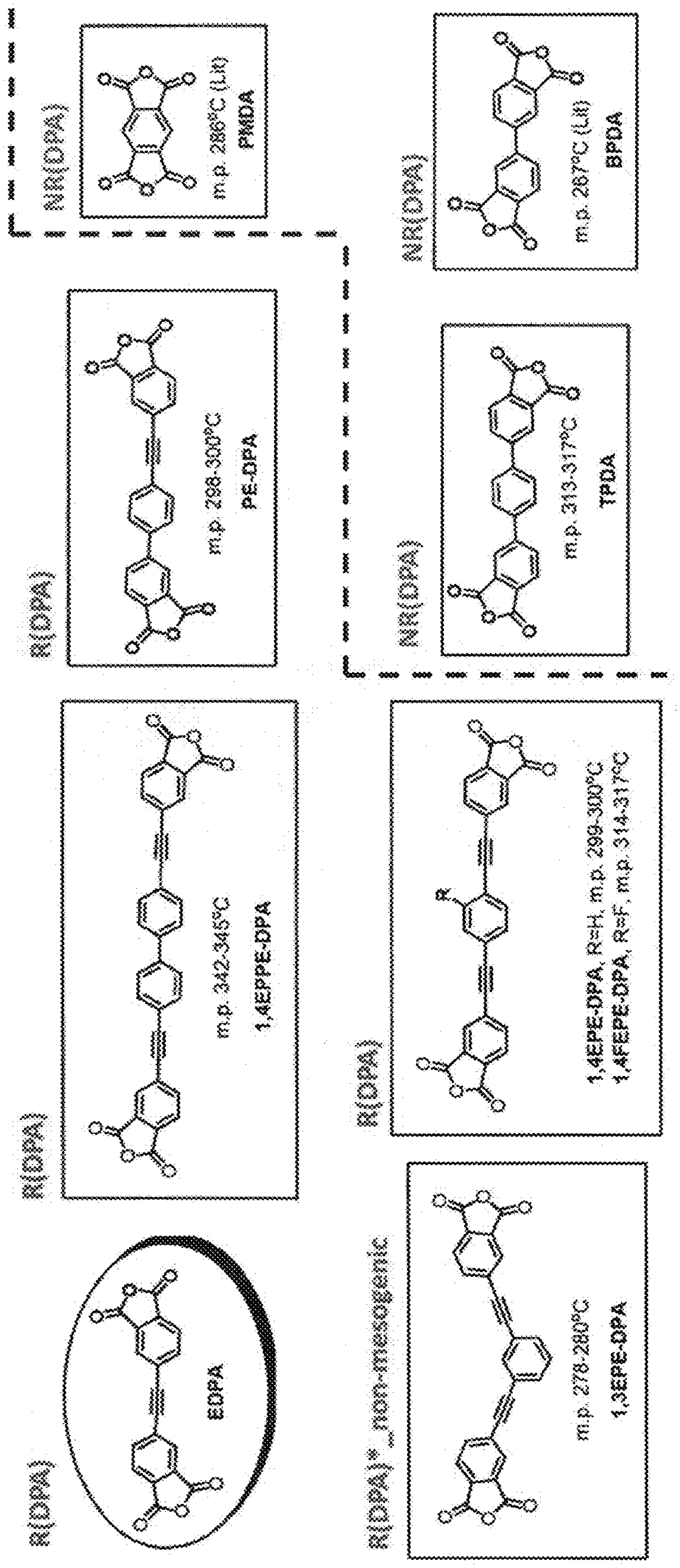
FIG. 2 depicts some examples of Reactive and Non-reactive Mesogenic Dianhydrides (R-DPA & NR-DPA)

Reactive and Non-reactive Mesogenic Dianhydrides (R-DPA & NR-DPA): Our non-PMDA mesogens, i.e., $L(DPA)_2$, belong to a family of aromatic rod-like dianhydrides with the general composition and formula of (PA)-L-(PA), where PA is phthalic anhydride and L is rigid connector such as an ethynyl (E), a praraphenylene (P), or a rigid moiety of a P-E combination; L can be divided into a reactive (R) group that contains one or more thermally reactive ethynyl (E) units, and non-reactive (NR) group when does not contain any ethynyl (E) unit such as the praraphenylene (P) and fluoro-substituted praraphenylene (PF). The generic structure is similar to that in FIG. 1(*b*) except that L is a rigid bridging group instead of the flexible group made up by polymethylene or polyoxyethylene chains. Structures of representative examples of reactive and non-reactive mesogenic dianhydrides are shown in FIG. 2.

Aromatic Endcappers. The use of thermally reactive 4-ethynylphthalic anhydride (PEPA) and non-reactive phthalic anhydride (PA) as endcapping agents would allow the control of the crosslinking density of $L(DPA)_2$-containing TLC-PI products. Thus, when the PE moiety are present in both the backbone and the termini of TLC-PI, higher crosslinking density is expected than when PE is only present in the polymer backbone.

Composition and Preparation of BACB-Homopolymers: Accordingly, two series of crosslinkable $L(DPA)_2$-containing TLC-PI homopolymers can be designed with the following generic composition and structures: (i) Phthalic anhydride or PA-endcapped series: PA-[BACB-(R)DPA]-PA and (ii) 4-ethynylphthalic anhydride, or PEPA-endcapped series: PEPA-[BACB-(NR)DPA]-PEPA Where (R)DPA is thermally reactive mesogenic dianhydrides, and NRDPA is a non-reactive one.

Figure 3:
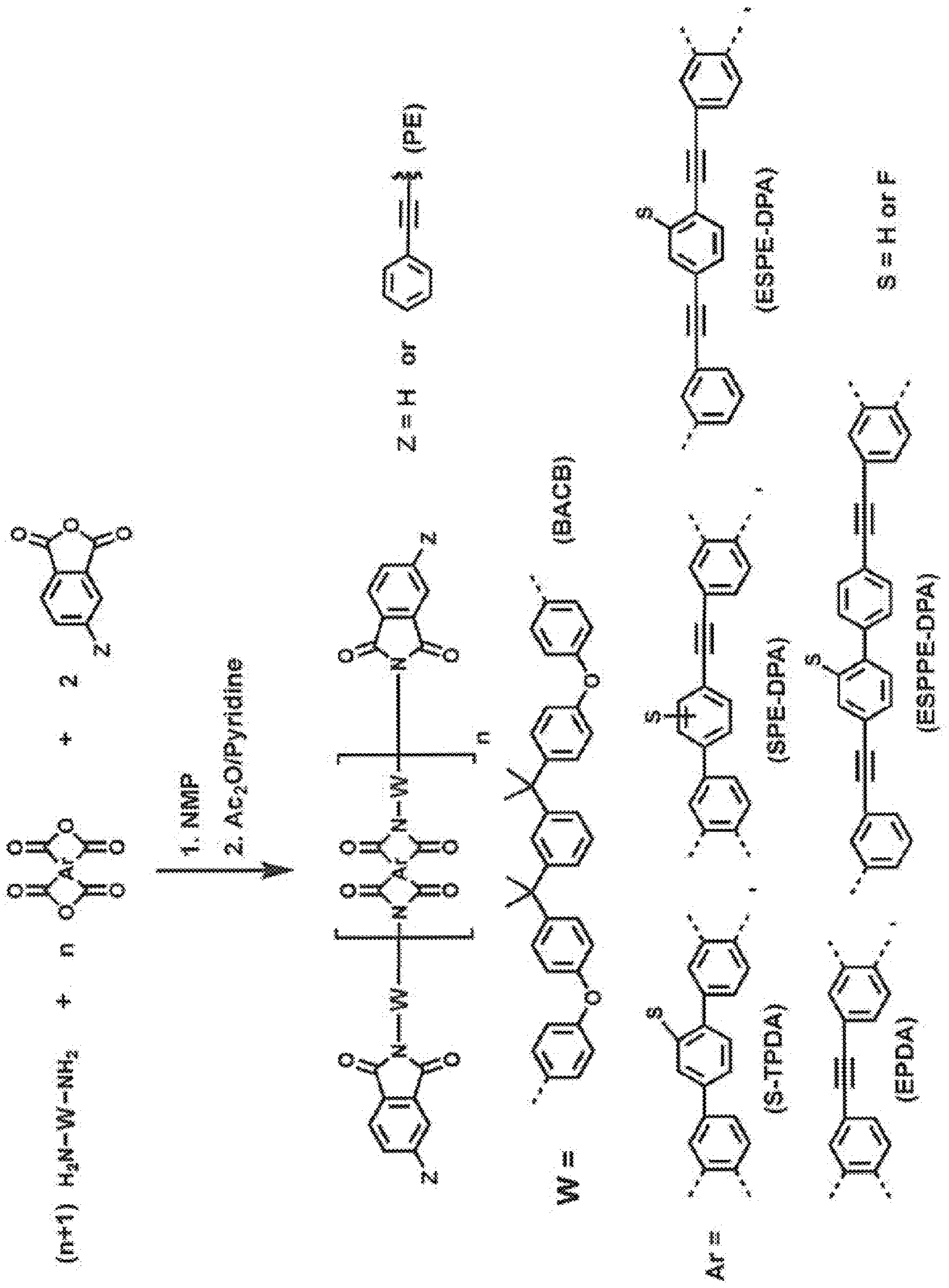
FIG. 3 depicts the generic structure and synthesis of two series of BACB-containing reactive oligo-imides that are endcapped with either phthalic anhydride (PA) or 4-phenylethynylphthalic anhydride (PEPA).
Figure 4:
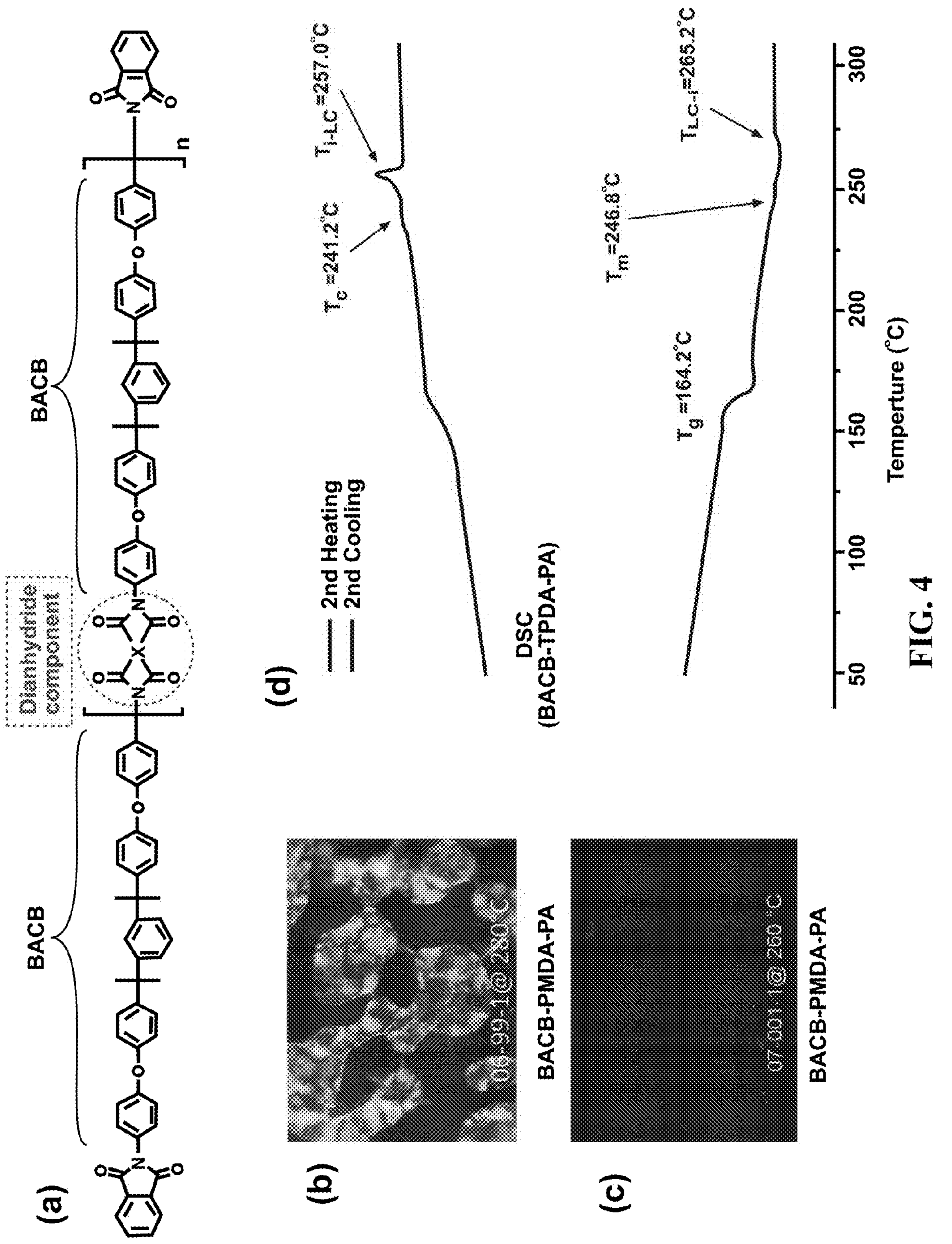
FIG. 4 depicts (b) POM image the liquid-crystalline phase of BACB-PMDA-PA at 280° C. in contract to the dark POM image (c) of BACB-EDPA-PA in isotropic phase at 260° C. and higher temperatures before degradation. DSC scans (d) reveal the mesophase transition of BACB-TPDA-PA.

The syntheses of phthalimide (PhI) and 4-phenylethynylphthalimide (PEPI)-terminated homopolymers are outlined in the generic scheme depicted in FIG. 3.

Liquid-Crystalline Polyimides with LC transition below 300° C. With reference to Table 1 and FIG. 3, the phthalic anhydride (PA) endcapped BACB-PMDA oligo-imide (n=12) was expectedly thermotropic liquid crystalline, but when its dianhydride component was replaced with a bis (phthalic anhydride) or $L(DPA)_2$ with a relatively short and rigid ethynyl linkage, i.e. DPA, liquid crystallinity clearly become inaccessible to the resulting BACB-EDPA-PA oligo-imide (n=12), as evidenced by the comparative polarized optical microscopy and DSC results. However, when the linkage is a para-phenylene ring, the resulting BACB-TPDA-PA oligoimide (n=12) exhibited liquid-crystallinity with well-defined mesophase transitions (260-272° C.) detected by DSC and confirmed by polarized optical microscopy (POM).

TABLE 1

Summary of DSC and POM results of phthaimide-encapped BACB-PMDA-PA, BACB-EDPA-PA and BACB-TPDA-PA oligo-imides, all with DP = 12.

| Polyimide (Sample ID) | X | $T_g$ (° C.) | $T_m$ (° C.) | $T_{L-I}$ | $T_{L-I}$ (° C.) | $T_c$ (° C.) | Phase |
|---|---|---|---|---|---|---|---|
| BACB-PMDA-PA (06-99-1) | 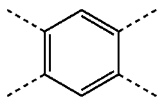 (PMDA) | ND | 271.6 | ND | 271.9 | 247.2 | Crystalline & Liquid crystalline |
| BACB-EDPA-PA (07-001-1) | 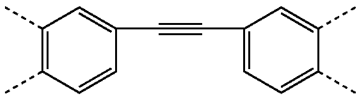 (EDPA) | 163.5 | Not Detected | Not Detected | Not Detected | Not Detected | Amorphous |
| BACB-TPDA-PA (07-16-1) | 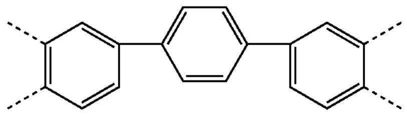 (TPDA) | 164.4 | 246.8 | 265.2 | 260.0 | 242.7 | Crystalline & Liquid crystalline |

Liquid-Crystalline Polyimides with LC transition below 300° C. and Thermally Crosslinkable After LC Phase. While the prior art has shown that the combination of biphenylene dianhydride (BPDA) and BACB diamine would result in a non-LC polyimide, these results teach us that when a bis (phthalic dianhydride) or $L(DPA)_2$ is used as the mesogen instead of PMDA, BACB can still promote liquid-crystallinity in a highly aromatic polyimide, provided that the aspect ratio (i.e., molecular dimension ratio of length/width) is at least that of terphenyl-dianhydride (TPDA). In addition, unlike the liquid-crystalline BACB-PMDA polyimide in the prior art, which is a linear polymer of high molecular weight, these results indicate that thermotropic liquid crystallinity is achievable for highly aromatic PI with relatively low molecular weight provided an $L(DPA)_2$ with the required aspect ratio is employed.

While the prior art has shown that the combination of biphenylene dianhydride (BPDA) and BACB diamine would result in a non-LC polyimide, these results teach us that when a bis(phthalic dianhydride) or L(DPA) is used as the mesogen instead of PMDA, BACB can still promote liquid-crystallinity in a highly aromatic polyimide, provided that the aspect ratio (i.e., molecular dimension ratio of length/width) is at least that of terphenyl-dianhydride (TPDA). In addition, unlike the liquid-crystalline BACB-PMDA polyimide in the prior art, which is a linear polymer of high molecular weight, these results indicate that thermotropic liquid crystallinity is achievable for highly aromatic PI with relatively low molecular weight provided an L(DPA) with the required aspect ratio is employed.

In addition, we have also demonstrated that when both BACB-PMDA and BACB-TPDA are endcapped by 4-phenylethynyl phthalic anhydride (PEPA), the resulting oligomers (n=12) are thermally reactive with onset temperature of crosslinking ~300° C. Table 2 summarizes the thermal properties of the phthalic anhydride and 4-phenylethynyl phthalic anhydride endcapped BACB-PMDA and BACB-TPDA oligoimides that possesses thermotropic liquid crystallinity.

TABLE 2

Thermal properties the PMDA-BACB and TPDA-BACB imide oligomers (DP = 12) that are endecapped with thermally nonreactive phthalic anhydride (PA) or thermally reactive 4-phenylethybylphthalic anhydride (PEPA).

| ID | Dianhydride | End Cap | Cured | $T_g$ (° C.) | $T_m$ (° C.) | $T_{L-i}$ (° C.) | $T_{L-i}$ (° C.) | $T_o$ (° C.) | Phase |
|---|---|---|---|---|---|---|---|---|---|
| 06-99-1 | PMDA | PA | No | ND | 271.6 | ND | 271.9 | 247.2 | Crystalline & Liquid crystalline |
| 07-36-1 | PMDA | PEPA | No | ND | 266.9 | ND | 260.0 | 241.4 | Crystalline & Liquid crystalline |
| 07-36-1 | PMDA | PEPA | Yes | ND | 248.3 | ND | ND | 240.4 | Crystalline (?) |
| 07-16-1 | TPDA | PA | No | 164.4 | 246.8 | 265.2 | 260.0 | 242.7 | Crystalline & Liquid crystalline |
| 07-36-2 | TPDA | PEPA | No | 164.3 | 236.0 | 263.8 | 258.6 | 234.2 | Crystalline & Liquid crystalline |
| 07-36-2 | TPDA | PEPA | Yes | 187.6 | 246.0 | ND | ND | 233.1 | Crystalline (?) |

Figure 5:
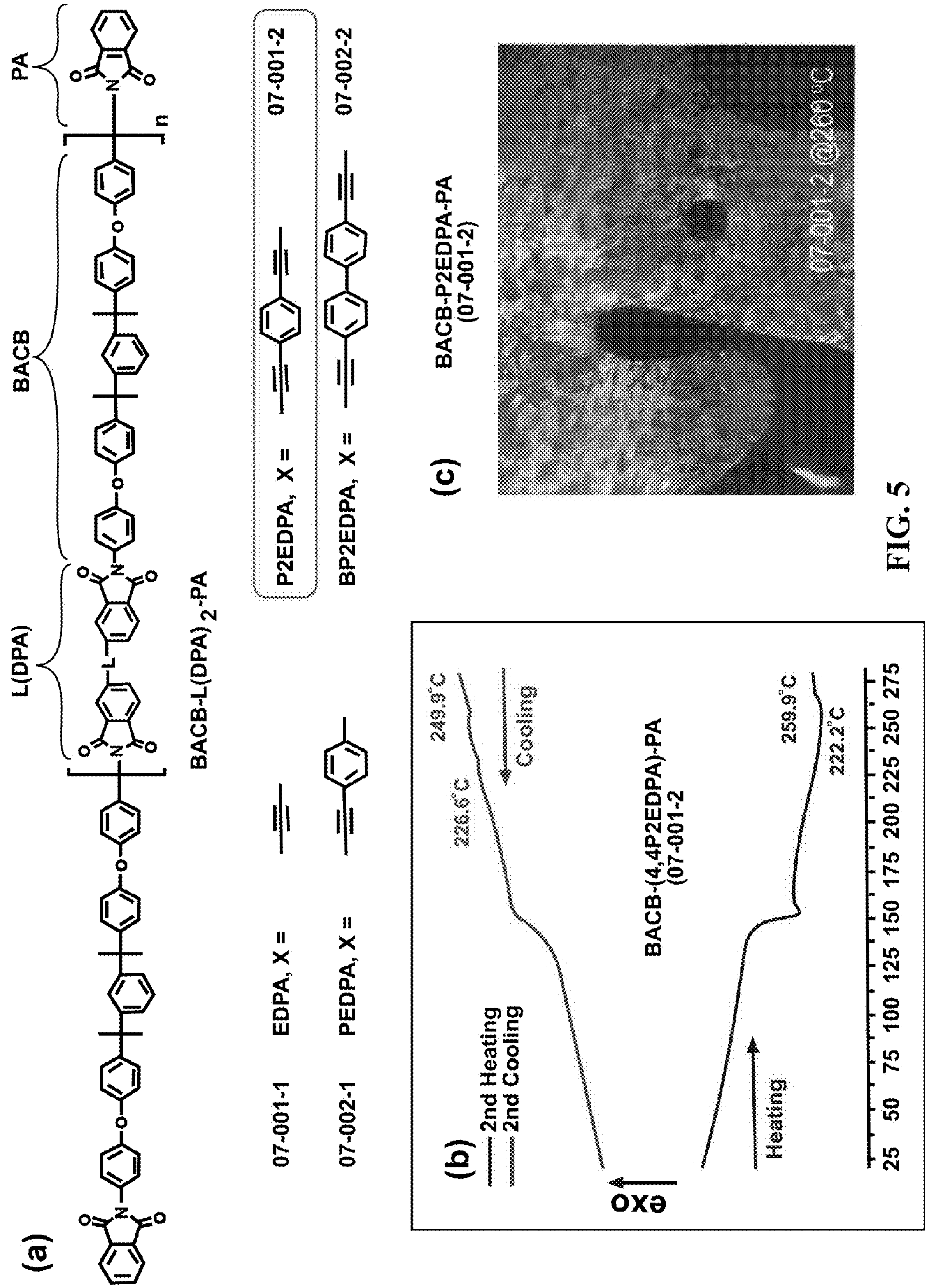
FIG. 5 depicts (a) the structures of phthalic anhydride (PA) endcapped BACB-L(DPA) oligoimides containing crosslinkable phenylethynyl (PE) units that have been synthesized to demonstrate the delicate effect of aspect ratio of L(DPA)-type mesogenic dianhydrides on the liquid crystallinity of high aromatic polyimides. Among the four BACB-L(DPA)-PA oligomers synthesized and characterized, only EPE(DPA), which has an intermediate value of aspect ratio, is able to endow LC properties to the resulting BACB-EPE (DPA)-PA oligoimide, as evidenced by its (b) DSC data and (c) POM observation that confirm LC mesophase ~253-260° C.

With reference to Table 3 and FIG. 5, a new series of phthalic-anhydride-endcapped homopolymers comprised of 12 repeating units has been synthesized to demonstrate that non-PMDA dianhydrides. L(DPA) with appropriate aspect ratio such as PEDPA and 4,4-P2EDPA in combination with BACB diamine can render the resulting polyimides both (a) liquid crystallinity and (b) thermal crosslinking reactivity.

TABLE 3

Summary of the thermal properties of phthalic anhydride (PA) endcapped BACB-L(DPA) oligo-iomides (n = 12) with respect to their LC mesophase transitions and thermal reactivity or curing.

| ID | Dianhydride | $T_g$ (° C.) | $T_m$ (° C.) | $T_{LC\text{-}iso}$ (° C.) | $T_{LC\text{-}iso}$ (° C.) | $T_{crys}$ (° C.) | $T_{onset}$ (° C.) | $T_{peak}$ (° C.) | ΔH (J/g) |
|---|---|---|---|---|---|---|---|---|---|
| 07-001-1 | EDPA | 163.5 | | Amorphous | | | 315.0 | 417.4 | 155.5 |
| 07-001-2 | EPE(DPA) | 162.2 | 216.2 | 261.2 | 252.7 | 226.1 | 311.3 | 391.6 | 131.6 |
| 07-002-1 | PEDPA | 158.0 | ND | 236.0 | 229.9 | ND | 252.8 | 450.9 | 152.7 |
| 07-002-2 | EPPE(DPA) | 147.1 | 362.1 | | Crystalline | | 362.1 | 410.1 | 138.1 |
| 07-003-1 | 1,3EPE(DPA) | 173.0 | | Amorphous | | | 280.2 | 380.3 | 150.2 |

According to Connell, Smith, and Hergenrother, Journal of Macromolecular Science, Reviews in Macromolecular Chemistry and Physics 2000, vol. C40, pp. 207-230, the thermal reaction of phenylethynyl (PE) groups when attached to the chain-ends or side-chains of a linear oligomer or polymer, it is thermo-chemically stable up to 300° C. When the PE-containing units are more spatially constrained (i.e. with both ends tied) in the main chain of the polymer than their counterparts at the chain-ends or side-chains (i.e. each with one end free of constraint), their resistance to thermal crosslinking is significantly increased with their reactivity concomitantly delayed to higher temperatures (≥350° C.), as illustrated by the work of T. Takeichi and M. Tanikawa, Journal of Polymer Science Part A: Polymer Chemistry 1996, vol. 34, pp. 2205-2211. The data in Table 3 show that the onset temperatures of the internal ethynyl groups in L(DPA) can range from 253-362° C., allowing the flexibility to coordinate LC and crosslink conditions by molecular engineering.

Figure 6:
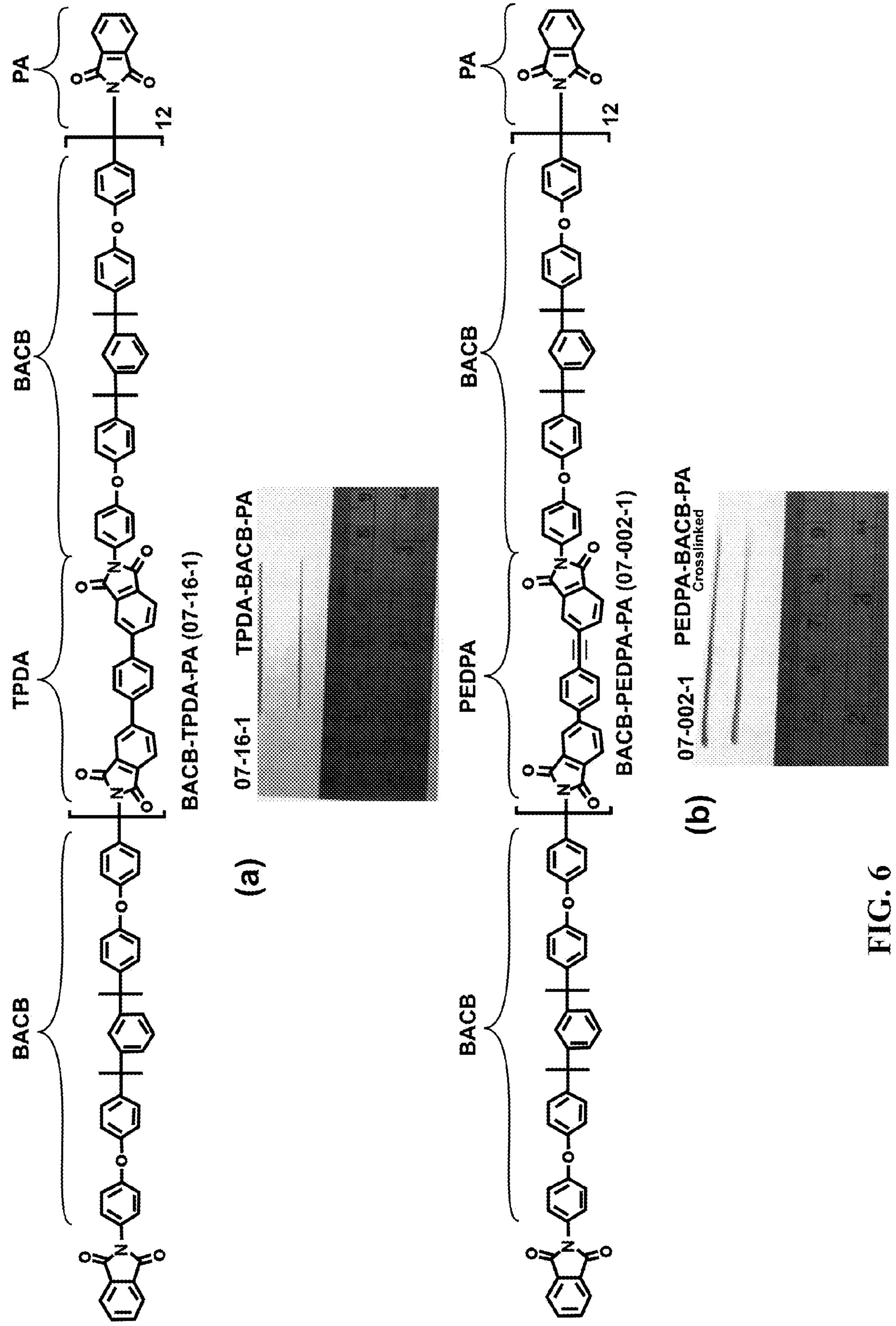
FIG. 6 depicts the pulled fibers from the polymer melts of TPDA-BACB-PA (07-16-1) and PEDPA-BACB-PA (07-002-1), both at 260-280° C.
Figure 7:
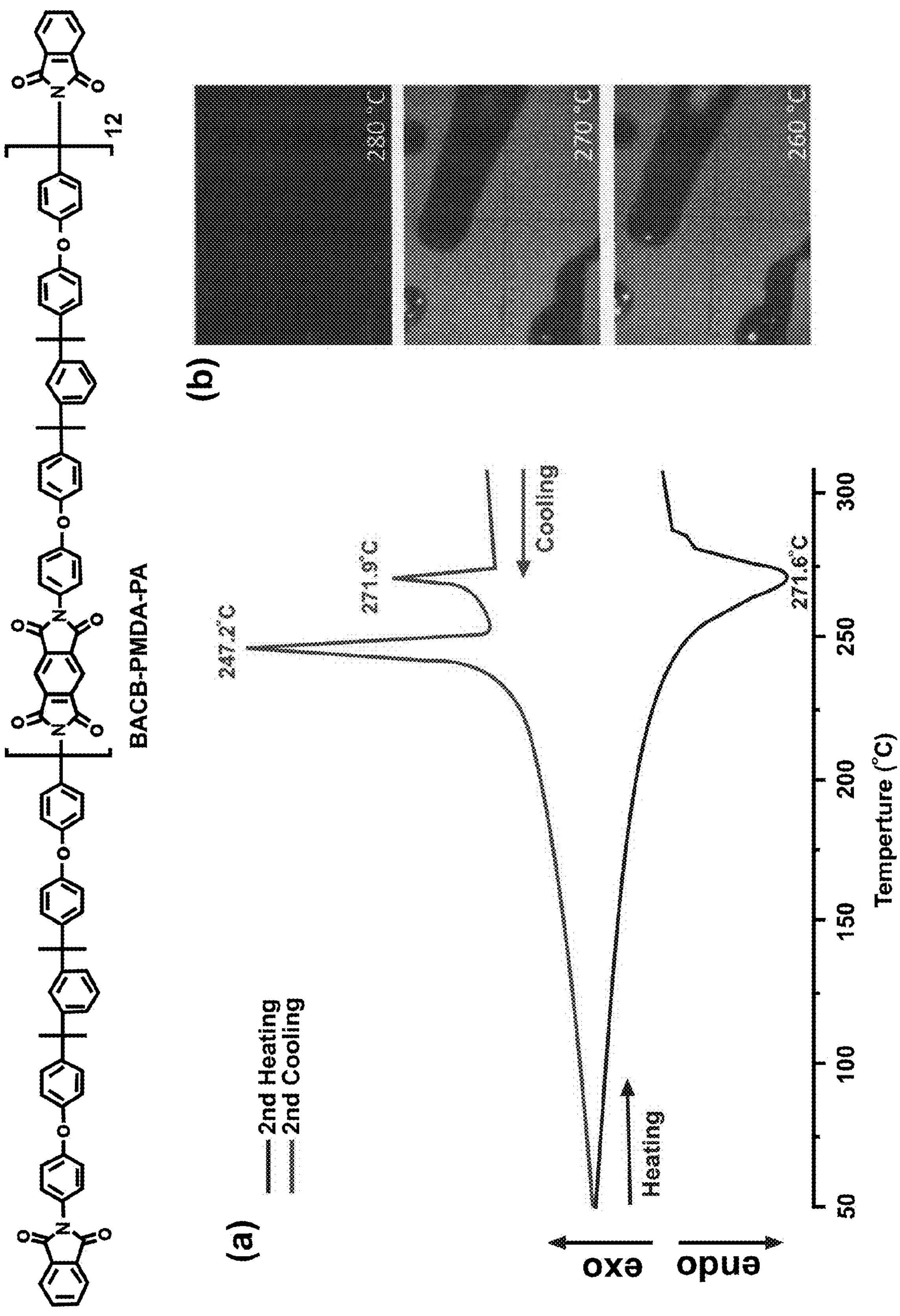
FIG. 7 depicts (a) heating and cooling DSC scans of phthalic anhydride (PA) endcapped BACB-PMDA oligoimide (n=12), revealing the LC mesophase ~250-270° C., which is confirmed by (b) the POM images taken at 280° C., 270° C. and 260° C. during cooling down period of BACB-PMDA-PA isotropic melt from 300° C.
Figure 8:
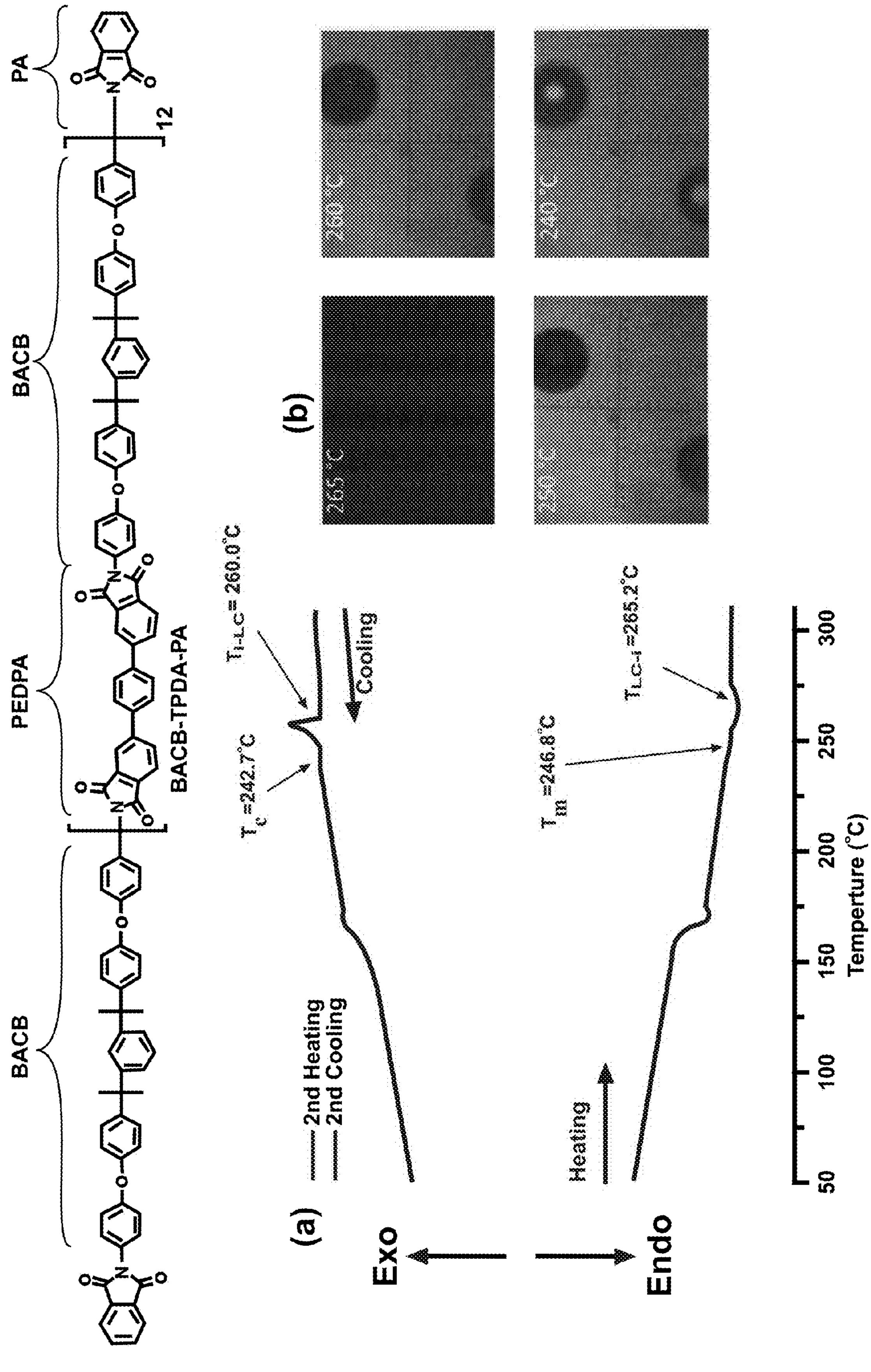
FIG. 8 depicts (a) heating and cooling DSC scans of phthalic anhydride (PA) endcapped BACB-TPDA oligoimide (n=12), revealing the LC mesophase ~260-265° C., which is confirmed by (b) the POM images taken at 265° C., 260° C., 250° C. and 240° C. during cooling down period of BACB-TPDA-PA isotropic melt from 300° C.
Figure 9:
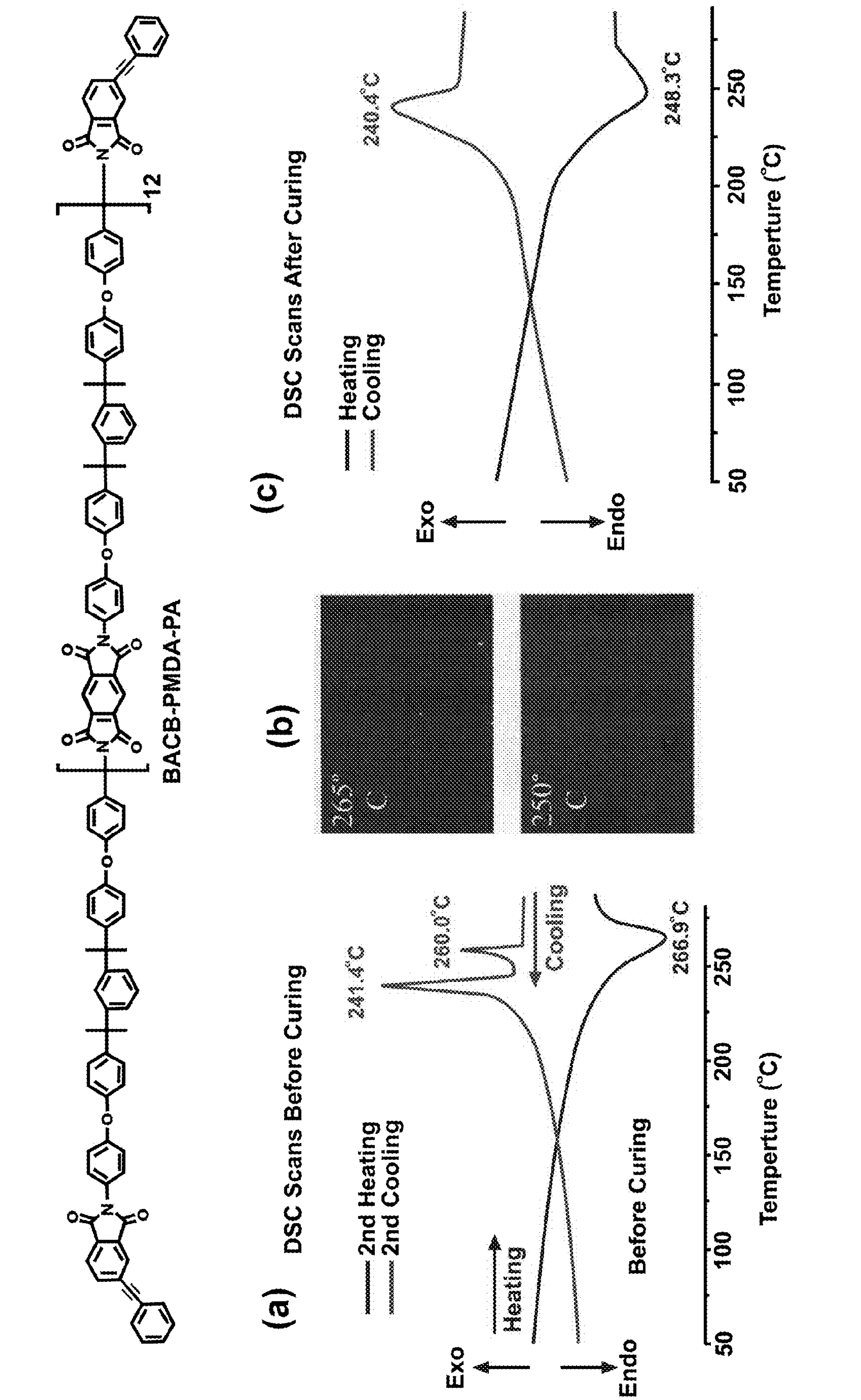
FIG. 9 depicts (a) heating (up to 300° C.) and cooling DSC scans of phenylethynyl phthalic anhydride (PEPA) endcapped BACB-PMDA oligoimide (n=12), revealing the LC mesophase ~265-250° C., which is confirmed by (b) the POM images taken at 265° C. (completely dark-field view), and 250° C. (becoming brightened) during cooling down period of BACB-PMDA-PEPA isotropic melt from 300° C. The DSC rescans (c) of the cured BACB-PMDA-PEPA sample that has been previously scanned to 450° C. reveal the crystalline character of the cured sample.
Figure 10:
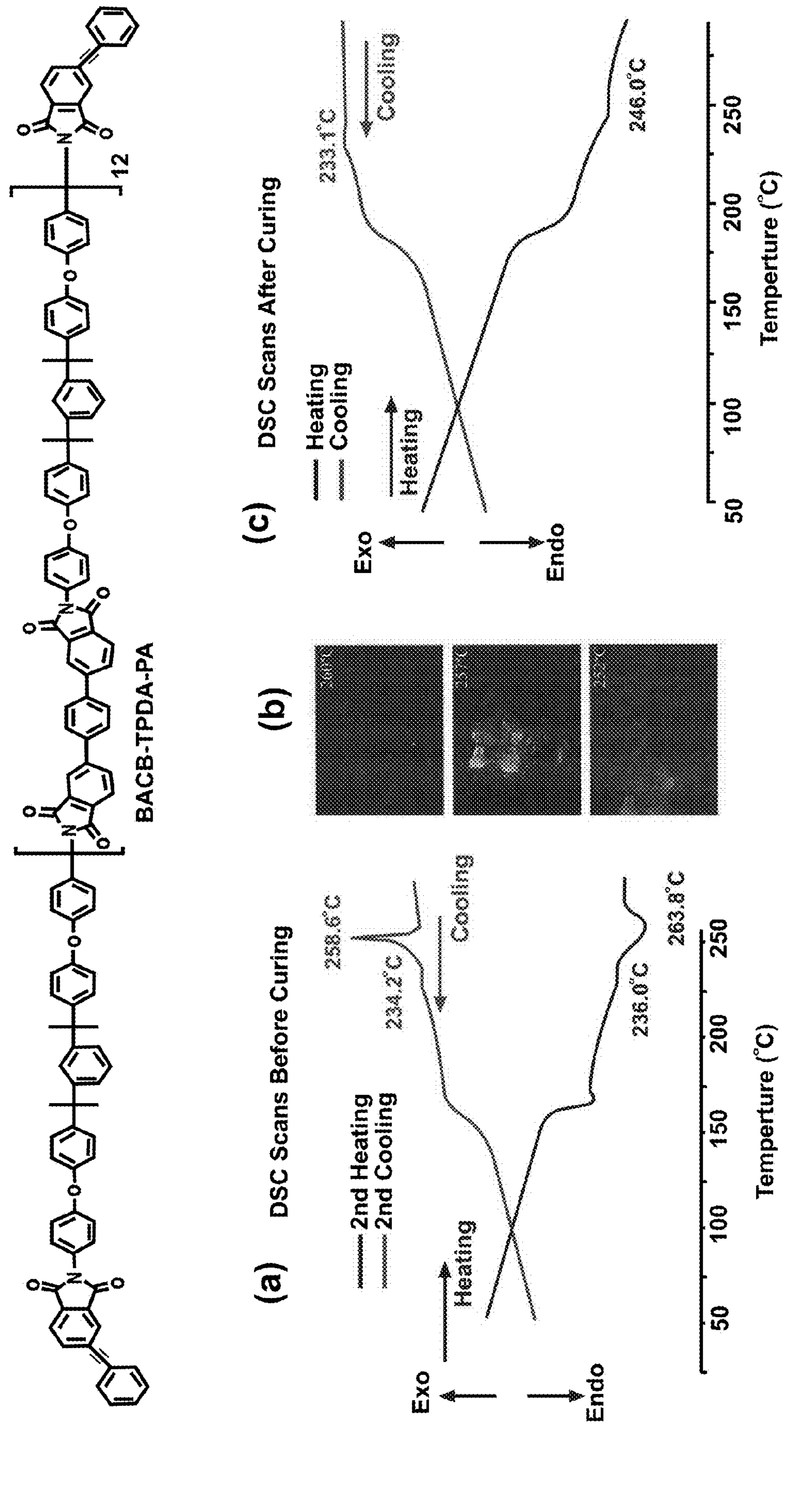
FIG. 10 depicts (a) heating (up to 300° C.) and cooling DSC scans of phenylethynyl phthalic anhydride (PEPA) endcapped BACB-TPDA oligoimide (n=12), revealing the LC mesophase ~260-252° C., which is confirmed by (b) the POM images taken at 260° C. (completely dark-field view), and 252° C. (becoming brightened) during cooling down period of BACB-TPDA-PEPA isotropic melt from 300° C. The DSC rescans (c) of the cured BACB-PMDA-PEPA sample that has been previously scanned to 450° C. reveal partial crystalline character of the cured sample.

Fiber Extrusion. 3D printing of interest is an extrusion-type polymer processing. Thus, the extrudability of both PA- and PEPA endcapped thermotropic BACB-L(DPA) polyimides is exemplified by fiber-forming capability of TPDA-BACB-PA (07-16-1) and BACB-PEDPA-PEPA (07-002-1) by respectively having fibers pulled from their melts as depicted in FIG. 6. Qualitatively, the crosslinked fiber of BACB-PEDPA-PEPA sample is mechanically more robust than that of TPDA-BACB-PA.

Low-Molecular-Weight, Main-Chain Thermotropic Liquid-Crystalline Polyimides (TLC-PI) that are Thermally Cross-linkable and Processes of Making and Using Same.

For purposes of this specification, headings are not considered paragraphs. In this paragraph Applicants disclose polyimide having the following formula:

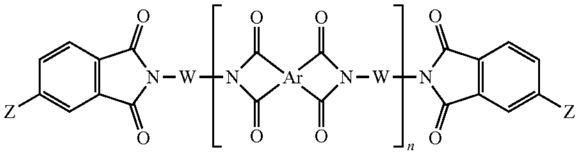

wherein n is an integer from 2 to 100, preferably n is an integer of 4 to 20, more preferably n is an integer of 6 to 18;

each Z is independently hydrogen or a phenylethynyl group;

each W has the following formula:

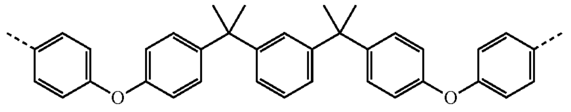

Ar has one of the following formula:

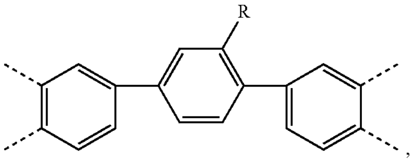

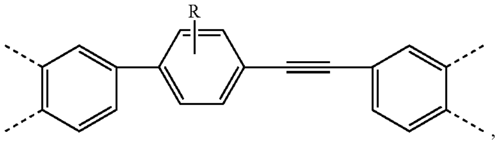

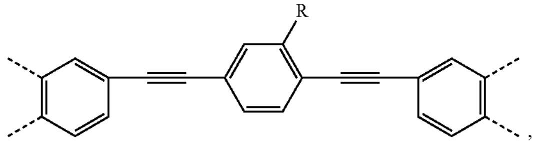

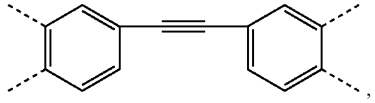

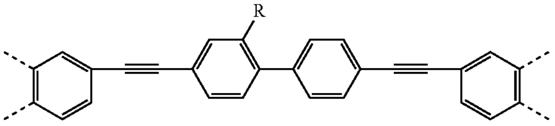

wherein R is H, Me, OMe, CN or F, preferably R is H, Me, OMe or F, more preferably R is H, Me or F, most preferably R is H or F.

Applicants disclose the polyimide of the previous paragraph wherein Ar has one of the following formula:

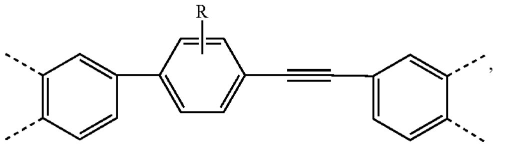
,
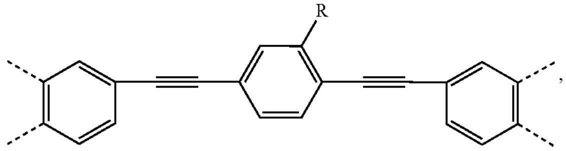
,
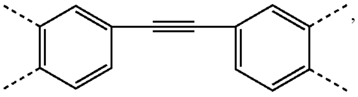
,
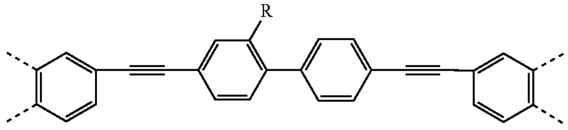

wherein R is H, Me, OMe, CN or F, preferably R is H, Me, OMe or F, more preferably R is H, Me or F, most preferably R is H or F.

EXAMPLES

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Example 1

Synthesis and characterization of polyimide oligomers with different molecule weight from pyromellitic dianhydride (PMDA) and 1,3-bis[4'-(4"-aminophenoxy)cumyl] benzene (BACB) with phthalic anhydride (PA) or 4-phenylethynyl phthalic anhydride (PEPA) end capping agents. Two series of PMDA-BACB oligomers were synthesized according to the “Dianhydride/Diamine/Endcapper” feed ratios in Table 6 so that the degree of polymerization ($X_n$) could be theoretically 3, 6, and 12. The feed ratios are in molar amounts but the actual synthesis was scaled down to 2 to 3 mmol of PMDA, which amount is the base of each of the feed ratios. The first series of oligomers was endcapped with PA and the second series of oligomers were endcapped with PEPA.

TABLE 6

Co-Monomer/Endcap Feeding Ratio and Calculated Degree of Polymerization ($X_n$) Based on Carothers Equation

| Sample ID | $X_n$ | PMDA (mol) | BACB (mol) | PEPA (mol) | PA (mol) |
|---|---|---|---|---|---|
| 06-99-1 | 12 | 13 | 13 | 0 | 2 |
| 07-42-1 | 6 | 6 | 7 | 0 | 2 |
| 07-45-1 | 3 | 3 | 4 | 0 | 2 |
| 07-36-1 | 12 | 12 | 13 | 2 | 0 |
| 07-42-2 | 6 | 6 | 7 | 2 | 0 |
| 07-45-2 | 3 | 3 | 4 | 2 | 0 |

Example 2 Representative Procedure: Synthesis of PA-Endcapped [BACB-PMDA]$_3$ Oligomer, 07-45-1

To a 100 mL round-bottomed flask equipped with a magnetic stir bar and nitrogen inlet, 1,3-bis[4'-(4"-aminophenoxy)cumyl]benzene (BACB), 2.1148 g, 4.00 mmol.) and 20 mL of 1-methyl-2-pyrrolidinone (NMP) were charged. After BACB had dissolved in NMP, 0.6544 g (3.00 mmol) of pyromellitic dianhydride (PMDA) was introduced. The polymerization mixture was stirred for 8 hours. Then, phthalic anhydride (PA, 0.2962 g, 2.00 mmol) was added and washed down with 6 mL of NMP to the reaction mixture. The resulting mixture was stirred at room temperature for additional 16 hours before 4.1 mL acetic anhydride and 3.2 mL pyridine were added to initiate the chemical imidization process. The mixture was stirred at room temperature for 16 hours, and yellow solids gradually formed. An additional 10 mL NMP was added to facilitate stirring of the thickening polymerization mixture. Finally, the mixture was heated to 80° C., which was for 2 hours, and then allowed to cool on its own to room temperature. The mixture was poured into 400 mL of isopropanol (IPA) in a beaker, and the solids were collected via filtration. The solids were washed with fresh IPA and acetone, and then air-dried. Finally, the oligomeric product was further dried in a vacuum oven, at 130° C., 0.5 torr, for 24 hours. The yield of product was quantitative.

Example 3 Representative Procedure: Synthesis of PEPA-Endcapped [BACB-PMDA]$_3$ Oligomer, 07-45-2

To a 100 mL round-bottomed flask equipped with a magnetic stir bar and nitrogen inlet, 1,3-bis[4'-(4"-aminophenoxy)cumyl]benzene (BACB) and 20 mL of 1-methyl-2-pyrrolidinone (NMP) were charged. After BACB had dissolved in NMP, PMDA (0.6544 g, 3.00 mmol) of was introduced. The polymerization mixture was stirred at room temperature for 8 hours. Then, 4-phenylethynyl phthalic anhydride (PEPA) (0.4965 g, 2.00 mmol) was added and washed down with 6 mL of NMP to the reaction mixture. The resulting mixture was stirred at room temperature for additional 16 hours before 4.1 mL acetic anhydride and 3.2 mL pyridine were added to initiate the chemical imidization process. The mixture was stirred at room temperature for 16 hours, and yellow solids gradually formed. An additional 10 mL NMP was added to facilitate stirring of the thickening polymerization mixture. Finally, the mixture was heated to 80° C., which was for 2 hours, and then allowed to cool on its own to room temperature. The mixture was poured into 400 mL of isopropanol (IPA) in a beaker, and the solids were collected via filtration. The solids were washed with fresh IPA and acetone, and then air-dried. Finally, the oligomeric product was further dried in a vacuum oven, at 130° C., 0.5 torr, for 24 hours. The yield of product was quantitative.

Example 4 Synthesis of PA-Endcapped $[TPDA\text{-}BACB]_{12}$ Oligoimide, 07-16-1

To a 100 mL round-bottomed flask with a nitrogen inlet, 1.1455 g (2.167 mmol) of 1,3-bis[4'-(4"-aminophenoxy) cumyl]benzene (BACB) and 18 grams of 1-methyl-2-pyrrolidinone were charged. The mixture was stirred at room temperature until all solids were dissolved. 0.7406 g (2.000 mmol) [1,1':4',1"-terphenyl]-3,3",4,4"-tetracarboxylic dianhydride (TPDA) was charged. The mixture was stirred at room temperature for 8 hours before 49.4 mg (0.333 mmol) of phthalic anhydride (PA) was added. The mixture was further stirred for 16 hours at room temperature. Then, 2.0 mL pyridine and 2.4 mL acetic anhydride was added. The mixture was stirred at room temperature for additional 24 hours. If gel formed during this process, the mixture would be heated to 100° C. and held for 4 hours after 24 hours at room. The mixture was precipitated in 2-propanol. The solids was harvested via filtration and washed with fresh 2-propanol and air dried. The final product was further dried at 130° C. in a vacuum oven at 0.5 torr for 24 hours.

Example 5 Synthesis of PEPA-Endcapped $[TPDA\text{-}BACB]_{12}$ Oligoimide, 07-36-2

To a 100 mL round-bottomed flask connected with nitrogen inlet, 1.1455 g (2.167 mmol) of 1,3-bis[4'-(4"-aminophenoxy)cumyl]benzene (BACB) and 18 grams of 1-methyl-2-pyrrolidinone were charged. The mixture was stirred at room temperature until all solids were dissolved. 0.7406 g (2.000 mmol) of [1,1':4',1"-terphenyl]-3,3",4,4"-tetracarboxylic dianhydride (TPDA) was added. The mixture was stirred at room temperature for 8 hours before 82.2 mg (0.333 mmol) of 4-phenylethynyl phthalic anhydride (PEPA) was added. The mixture was further stirred for 16 hours at room temperature. Then, 2.0 mL of pyridine and 2.4 mL of acetic anhydride were added. The mixture was stirred at room temperature for additional 24 hours. If gel formed during this process, the mixture would be heated to 100° C. and held for 4 hours and then would be allowed to cool to room temperature over a 24-hour period. The mixture was precipitated in 2-propanol. The solids was harvested via filtration and washed with fresh 2-propanol and air dried. The final product was further dried at 130° C. in a vacuum oven at 0.5 torr for 24 hours.

Example 6 Thermal and Polarizing Light Microscopic Characterization

The PA-endcapped and PEPA-endcapped oligomers were characterization by differential scanning calorimetry (DSC) and polarization optical microscope (POM) and their plots and images are depicted in FIGS. 7-10. The results and associated data are summarized in Table 7. For the oligomers with low degree of polymerization, i.e., low number of repeating unit ($X_n$), no liquid crystalline mesophase has been detected. Table 7 indicates that with decrement in the $X_n$ value, the cooling process indicates that both the transition temperatures from isotropic phase to liquid crystalline phase ($T_{iso\text{-}LC}$), and from liquid crystalline phase to crystalline phase ($T_{crys}$), would decrease.

the gap between $T_{iso\text{-}LC}$ and $T_{crys}$ also decreases with decrement in $X_n$. These results are in agreement with the known fact that the stability of liquid crystalline phase is depended on degree of polymerization (DP) and molecular weight (MW).

The nature and size of endcapping groups also affect the transition temperatures. Comparing to the oligomers PA endcaps, the oligomers with larger PEPA endcaps tend to exhibit lower transition temperatures. The larger endcap tends to de-stabilize the ordered phase.

TABLE 7

Thermal Properties of PA- and PEPA-endcapped BACB-PMDA Oligoimides with varied degree of polymerization ($X_n$).

| ID (Endcap) | $X_n$ | $T_g$ (° C.) | $T_m$ (° C.) | $T_{LC\text{-}iso}$ (° C.) | $T_{iso\text{-}LC}$ (° C.) | $T_{crys}$ (° C.) | Phase |
|---|---|---|---|---|---|---|---|
| 06-99-1 (PA) | 12 | ND | 271.6 | ND | 271.9 | 247.2 | Crystalline & Liquid crystalline |
| 07-42-1 (PA) | 6 | ND | 267.4 | ND | 251.8 | 244.3 | Crystalline & Liquid crystalline |
| 07-45-1 (PA) | 3 | ND | 253.0 | ND | ND | 236.7 | Crystalline |
| 06-36-1 PEPA | 12 | ND | 266.9 | ND | 260.0 | 241.4 | Crystalline & Liquid crystalline |
| 07-42-2 (PEPA) | 6 | ND | 266.4 | ND | 252.3 | 239.7 | Crystalline & Liquid crystalline |
| 07-45-2 PEPA | 3 | ND | 251.7 | ND | ND | 232.7 | Crystalline |

Example 6

All polymerizations to generate PA-endcapped $[BACB\text{-}L(DPA)]_{12}$ oligoimides were carried out according to the "Comonomers/Endcap" feeding ratios shown in Table 8. In actual polymerizations, the amount of each dianhydride was kept constant 2.000 mmol and the amounts of BACB and phthalic anhydride (PA) were adjusted according to the stoichiometric ratio of Dianhydride (12):BACB (13):PA (2). Table 8. Feeding ratios of $R(DPA)_2$ dianhydride, BACB diamine, and PA endcapping agent to standardize the degree of polymerization ($X_n$) to 12.

| ID | Dianhydride, L(DPA) | Dianhydride, L(DPA) (mol) | BACB (MW = 542.71) (mol) | PA (MW = 148.12) (mol) |
|---|---|---|---|---|
| 07-001-1 | EDPA (MW = 318.24) | 12 | 13 | 2 |
| 07-001-2 | PEDPA (MW = 394.33) | 12 | 13 | 2 |
| 07-002-1 | EPE-DPA (MW = 418.35) | 12 | 13 | 2 |
| 07-002-2 | EPPE-DPA (MW = 494.45) | 12 | 13 | 2 |

General preparative procedure of the series of phthalic anhydride (PA)-endcapped BACB-R(DPA)$_2$ oligo using the synthesis of PA-endcapped [BACB-(PE2DPA)]$_{12}$ oligoimide (07-002-1) as a representative example.

To a 100 mL round-bottomed flask with a condenser connect to a nitrogen inlet, 1.1455 g (2.167 mmol) of 1,3-bis[4'-(4"-aminophenoxy)cumyl]benzene (BACB) and 18 grams (~20 mL) of 1-methyl-2-pyrrolidinone were charged. The mixture was stirred at room temperature until all solids were dissolved. Then, 0.8367 g (2.000 mmol) of 4,4'-(1,4-phenylenebis(ethyne-2,1-diyl))diphthalic dianhydride (EPE-DPA) was added. The polymerizing mixture was stirred at room temperature under nitrogen for 8 hours before 49.4 mg (0.333 mmol) of phthalic anhydride was added. The resulting reaction mixture was further stirred for 16 hours at room temperature before the addition of 2.0 mL pyridine and 2.4 mL acetic anhydride. The chemical imidization of the phthalic anhydride endcapped polyamic acid was stirred at room temperature for additional 24 hours. If some gel were to form in the reaction mixture during the stage of chemical imidization, the mixture would be heated to and at 100° C. 4 hours, and then allowed to cool to room temperature with continuing stirring over a period of 24 hours. Finally, the polymer product was precipitated in 2-propanol, collected by filtration, washed with 2-propanol, and air-dried. The final polymer product was further dried at 130° C. in a vacuum oven at 0.5 torr for 24 hours.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and process, and illustrative examples shown and described. Accordingly, departures may be made from such details without departing from the scope of the general inventive concept.

What is claimed is:

1. A polyimide, said polyimide being a thermotropic liquid crystal, said polyimide having the following formula:

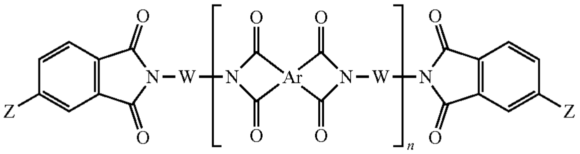

wherein:

n is an integer from 2 to 100;

each Z is independently hydrogen or a phenylethynyl group;

W has the following formula

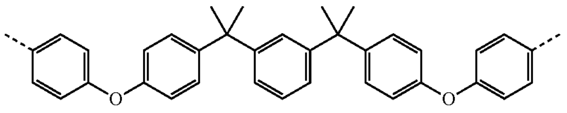

Ar has one of the following formula:

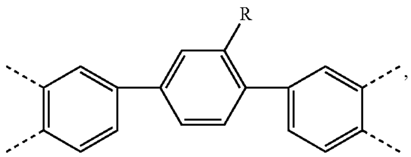

,

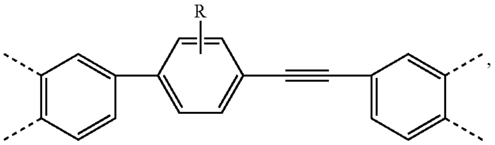

,

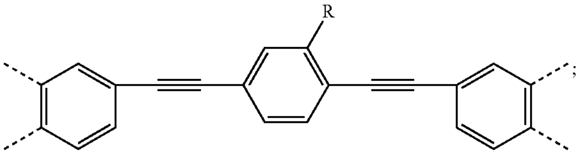

;

wherein R is OMe, CN or F.

2. The polyimide of claim 1 wherein n is an integer of 4 to 20.

3. The polyimide of claim 1 wherein n is an integer of 6 to 18.

4. The polyimide of claim 1 wherein R is OMe or F.

5. The polyimide of claim 1 wherein R is F.

6. The polyimide of claim 1 wherein Ar has one of the following formula:

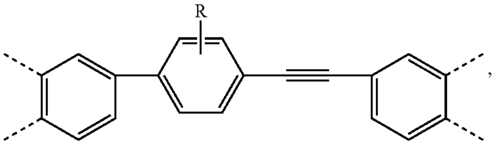

,

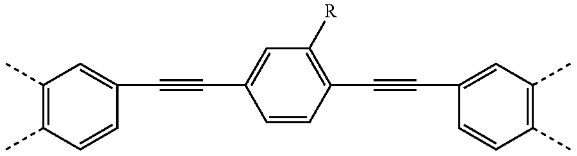

wherein R is OMe, CN or F.

7. The polyimide of claim 6 wherein n is an integer of 4 to 20.

8. The polyimide of claim 6 wherein n is an integer of 6 to 18.

9. The polyimide of claim 6 wherein R is OMe or F.

10. The polyimide of claim 6 wherein R is F.

11. The polyimide of claim 1 wherein for the structure
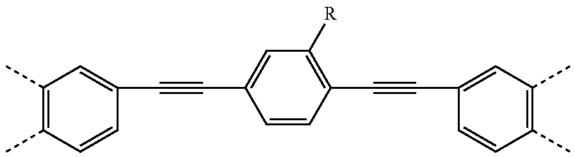
R is OMe, CN or F.
12. The polyimide of claim 11 wherein R is F.
13. The polyimide of claim 6 wherein for the structure
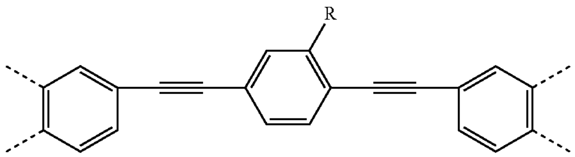
R is OMe, CN or F.
14. The polyimide of claim 13 wherein R is F.
* * * * *